United States Patent [19]

Niikura et al.

[11] Patent Number: 4,577,737

[45] Date of Patent: Mar. 25, 1986

[54] LOCK-UP TORQUE CONVERTER AND METHOD FOR CONTROLLING CLUTCH SLIP IN LOCK-UP TORQUE CONVERTER

[75] Inventors: Yasuhiro Niikura; Yoshiro Morimoto; Hideo Hamada, all of Yokosuka; Masaaki Suga; Takashi Murasugi, both of Yokohama, all of Japan

[73] Assignee: Nissan Motor Co., Ltd., Yokohama, Japan

[21] Appl. No.: 518,915

[22] Filed: Aug. 1, 1983

[30] Foreign Application Priority Data

Aug. 2, 1982 [JP] Japan .................................. 57-134900
Aug. 2, 1982 [JP] Japan .................................. 57-134901

[51] Int. Cl.⁴ ........................... F16D 47/06; G01L 3/02
[52] U.S. Cl. .................................. 192/0.032; 192/3.3; 192/3.31; 73/862.33
[58] Field of Search ................. 192/0.032, 0.034, 3.28, 192/3.29, 3.31, 3.3; 73/862.33

[56] References Cited

U.S. PATENT DOCUMENTS

| | | |
|---|---|---|
| 2,461,685 | 2/1949 | Godsey, Jr. ........................ 73/862.33 |
| 2,717,673 | 9/1955 | Zeidler ................................. 192/3.3 |
| 3,537,553 | 11/1970 | Olsen ........................... 192/0.034 X |
| 3,730,315 | 5/1973 | Annis .................................. 192/3.3 |
| 3,888,116 | 6/1975 | Spinella ........................... 73/862.33 |
| 3,937,104 | 2/1976 | Van Gorder ................ 192/0.034 X |
| 3,940,979 | 3/1976 | Ward et al. ....................... 73/862.33 |
| 4,002,228 | 1/1977 | Borman ............................... 192/3.3 |
| 4,056,177 | 11/1977 | Ahlen et al. ..................... 192/0.032 |
| 4,105,100 | 8/1978 | Iijima ................................ 192/0.034 |
| 4,305,487 | 12/1981 | Sunohara .......................... 192/3.28 |
| 4,431,095 | 2/1984 | Suga .................................... 192/3.31 |
| 4,448,275 | 5/1984 | Kitagawa et al. ........... 73/862.33 X |
| 4,488,443 | 12/1984 | Parkinson ........................ 73/862.33 |

FOREIGN PATENT DOCUMENTS

57-33253 2/1982 Japan .
59-34061 2/1984 Japan ................................. 192/3.29

*Primary Examiner*—Rodney H. Bonck
*Assistant Examiner*—Richard M. Lorence
*Attorney, Agent, or Firm*—Schwartz, Jeffery, Schwaab, Mack, Blumenthal & Evans

[57] ABSTRACT

A torque transmission through the hydrodynamic drive is directly measured by a torque sensor and a desired torque transmission is obtained for operating condition of a prime mover. The clutch slip of a lock-up clutch is adjusted toward a value where the measured torque transmission agrees with the desired torque transmission.

14 Claims, 14 Drawing Figures

DIRECTION OF ROTATION

LOCK-UP TORQUE CONVERTER AND METHOD FOR CONTROLLING CLUTCH SLIP IN LOCK-UP TORQUE CONVERTER

BACKGROUND OF THE INVENTION

The present invention relates to a lock-up torque converter and a method for controlling the clutch slip in a lock-up torque converter.

Torque converters which provide a hydrodynamic drive produce poor power transmission efficiency although they function to absorb the variations in torque, thus providing a smooth power transmission. Lock-up torque converters have been proposed to improve the power transmission efficiency of the torque converters. The lock-up torque converters have a fluid operated friction clutch which is often called as a "lock-up clutch" and provide a hydrodynamic drive when the clutch is disengaged and a mechanical drive when the clutch is engaged. Although the power transmission efficiency is increased if the clutch is left engaged, the lock-up torque converter tends to vibrate under certain operating conditions of a prime mover if the clutch is engaged.

Laid-open Japanese Patent Application No. 57-33253 discloses a lock-up torque converter wherein clutch slip is detected by measuring a difference between rotational speed of a crank shaft of an engine and that of an output shaft of the torque converter and the engagement of a fluid operated clutch is adjusted to a degree where the measured difference agrees with a preset value. Since in this known lock-up torque converter, a change in the clutch slip resulting from a chnage in the output torque of the prime mover is detected after the occurrence of the change in the clutch slip, the degree of the engagement of the clutch slip which is effected in response to the change in the clutch slip tends to be always delayed, thus failing to accomplish satisfactory accuracy in control. Owing to the tolerances upon manufacture, the lock-up torque converters do not have uniform torque transmitting characteristics. Thus, the degree of clutch slip desired for a transmission torque which depends on the torque transmitting characteristic varies from torque converter to torque converter. As a result, since the preset value to which the clutch slip is adjusted cannot be adjusted to the variation in the torque transmitting characteristic owing to the tolerance, a desired result intended by the control can not be obtained throughout the manufactured torque converters. Thus, a deviation in control has resulted.

U.S. Pat. No. 4,002,228 discloses a lock-up torque converter wherein a hydrodynamic drive and a fluid operated clutch drive are arranged in parallel drive relationship. The clutch slip is controlled by a passage having a variable opening responsive to the torque transmitted by the hydrodynamic drive to split the input torque so as to limit the torque transmission through the hydrodynamic drive. The clutch transmits the remainder of input torque from the prime mover to a mechanical gear arrangement. Since the clutch slip is controlled in response to the torque transmitted by the hydrodynamic drive only and thus the clutch slip is adjusted after vibration resulting from a change in the torque transmitted has taken place, it cannot prevent the occurrence of vibration resulting from the change in the torque transmitted by the hydrodynamic drive during a portion of operating conditions of the vehicle, such as upon acceleration.

SUMMARY OF THE INVENTION

According to the present invention, there is provided a method for controlling the clutch slip in a lock-up torque converter having a fluid operated clutch, comprising:

measuring a torque transmission through the hydrodynamic drive;

determining a desired torque transmission through the hydrodynamic drive for operating condition of the prime mover; and controlling the degree of the engagement of the fluid operated friction clutch so as to adjust the measured torque transmission toward a value which agrees with the desired torque transmission.

According to the present invention, there is provided a lock-up torque converter comprising:

a torque converter including a stationary sleeve, an input shell driven by a prime mover, a pump impeller secured to the input shell and cooperating therewith to form an enclosed space, a turbine runner disposed in the enclosed fluid space between the input shell and the pump impeller and cooperating with the impeller to form a toroidal circuit, and an output hub connected to the turbine runner;

a fluid operated friction clutch disposed between the turbine runner and the input shell to define an engagement chamber between the fluid operated clutch and the turbine, a disengagement chamber between the fluid operated clutch and the input shell, and a plurality of spring means for providing a drive torque transmitting connection between the turbine runner and the output hub;

a torque sensor means for measuring torque transmission from the turbine runner to the output hub and generating a sensor output signal indicative of the measured torque transmission;

means for determining a desired torque transmission from the turbine to the output hub for operating condition of the prime mover and generating a desired signal indicative of the desired torque transmission; and control means for providing the fluid operated clutch with an engaging fluid pressure to adjust the torque transmission toward a value which agrees with the desired torque transmission.

An object of the present invention is to provide a method for controlling the slip in the lock-up torque converter which prevents the occurrence of vibration over all of the operating conditions of the prime mover.

A specific object of the present invention is to provide a method for controlling the clutch slip in a lock-up torque converter wherein a torque transmitted by the hydrodynamic drive is directly measured by a torque sensor.

Another object of the present invention is to provide a lock-up torque converter having a torque sensor which directly measures the torque transmitted by the hydrodynamic drive.

A still another object of the present invention is to provide a torque sensor for a torque transmitting mechanism which sensor can measure the torque transmission accurrately.

BRIEF DESCRIPTION OF THE DRAWINGS

The present invention will be described hereinafter in connection with the accompanying drawings, in which.

DETAILED DESCRIPTION OF THE INVENTION

Figure 1A:
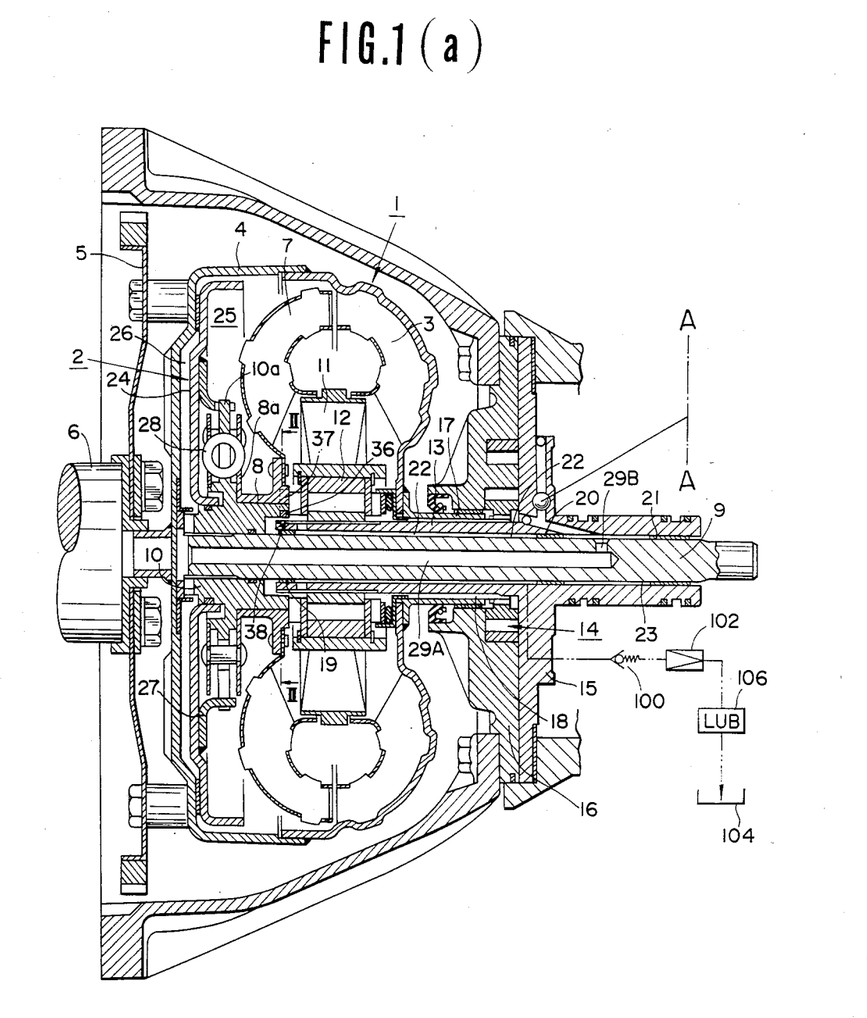
FIGS. 1(a) and 1(b) when combined illustrate a longitudinal sectional view of a lock-up torque converter embodying the present invention.
Figure 1B:
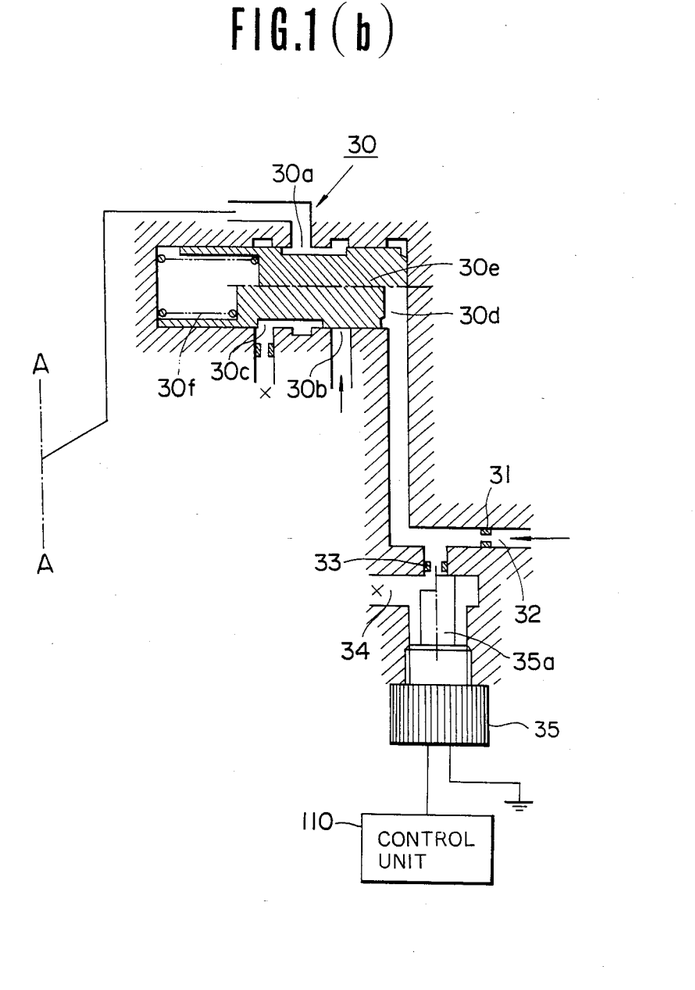

Referring to FIGS. 1(a) and 1(b), a lock-up torque converter is illustrated which comprises a torque converter 1 and a fluid operated friction clutch or a lock-up clutch 2. The torque converter 1 includes an input shell 4 or a converter cover secured to an output shaft 6 of a prime mover, such as an internal combustion engine, not shown, via a drive plate 5. The torque converter 1 includes a pump impeller 3 secured to the input shell 4 and cooperates therewith to form an enclosed space. The torque converter 1 also includes a turbine runner 7 disposed in the enclosed space between the input shell 4 and pump impeller 3 and cooperates with the pump impeller 3 to form a toroidal circuit. The turbine runner 7 has secured thereto a turbine hub 8 which is rotatably coupled with an output hub 10 splined to a torque converter output shaft 9. The torque converter 1 further includes a stator 11 mounted to a stationary sleeve 13 via a one-way clutch 12. The sleeve 13 is integrally formed with a pump cover 15 of a gear pump 14. The gear pump 14 is accommodated in a space between the pump cover 15 and a pump housing 16. This gear pump 14 is driven by a hollow pump driving shaft 17 secured to the pump impeller 3.

An annular feed passage 18 for feeding working oil to the inside of the torque converter 1 is defined between the pump driving shaft 17 and the stationary sleeve 13. Through this feed passage 18, oil is supplied to the toroidal circuit via the inner periphery of the pump impeller 3 by the gear pump 14. An annular space is defined between the output shaft 9 and stationary sleeve 13. Three spacers in the form of bushes 19, 20 and 21 are disposed in the annular space and define two annular passages 22 and 23. The passage 22 has one end communicating with the toroidal circuit of the torque converter 1 via the inner periphery of the turbine runner 7 and an opposite end communicating with a pressure maintaining valve 100 which in turn communicates with an oil cooler 102. The oil cooler communicates with an oil reservoir via various parts 106 which require lubrication. The other passage 23 serves as a lock-up passage providing communication between a disengagement chamber 26 of the lock-up clutch 2 and a lock-up control valve 30 which will be described later.

The lock-up clutch 2 is disposed between the turbine runner 7 and the input shell 4 to define an engagement chamber 25 between the clutch 2 and the turbine runner 7 and a disengagement or lock-up chamber 26 between the clutch 2 and the input shell 4. The clutch 2 has a clutch piston 24 slidably mounted on the output hub 10. The piston 24 has secured thereto an annular mounting member 27 drivingly engaging the radially extending section 10a of the output hub 10 and a plurality of torsion springs, only one being shown at 28, acting between the radially extending section 10a of the output hub 10 and the radially extending section 8a of the turbine hub 8. The construction between the clutch piston 24, annular member 27, radially extending section 10a, springs 28 and radially extending section 8a of the turbine hub 8 is similar to the relationship between a clutch piston 26, an annular mounting member 30, springs 35, a flange 32a, and a plate 34 as disclosed in U.S. Pat. No. 4,305,487 issued on Dec. 15, 1981 to Yoshio SUNOHARA and assigned to Nissan Motor Company, Limited.

The disengagement chamber 26 communicates with an axial blind bore 29A formed in the output shaft 9 which in turn communicates with the annular passage 23 via a radial opening 29B formed through the output shaft 9. The annular passage 23 in turn communicates with an output port 30a of a lock-up control valve 30. The lock-up control valve 30 is formed also with a port 30b which receives converter pressure supplied to the chamber 25 and a drain port 30c. The lock-up control valve 30 has a spool 30e biased by a spring 30f. In a spring set position of the spool 30e as illustrated by the upper half thereof viewing in FIG. 1(b), the port 30a communicates only with the port 30b. When the spool 30e is moved against the spring 30f to a spring resisted position as illustrated by the lower half thereof viewing in FIG. 1(b), the port 30a is allowed to communicate only with the drain port 30c. In the middle positions of the spool 30e between the spring set position thereof and the spring resisted position thereof, the port 30a is allowed to communicate with both of the ports 30b and 30c.

The spool 30e defines a bias chamber 30d between a closed end of a bore accommodating the spool 30e and the adjacent axial end of the spool 30e. The bias chamber 30d communicates through an orifice 31 with an oil conduit 32 of a hydraulic control system for an automatic transmission, which oil conduit receives an actuating fluid pressure for actuating a fluid operated device or devices which are engaged during forward travelling of a vehicle. The chamber 30d is connected also with a drain port 34 via an orifice 33. A lock-up solenoid 35 is arranged to close the fixed orifice 33. When the lock-up solenoid 35 is not energized, a plunger 35a assumes its retracted position thus permitting the fixed orifice 33 to communicate with the drain port 34, while the energization of the solenoid 35 causes the plunger 35a to project to close the fixed orifice 33, thus shutting off the communication of the orifice 33 with the drain port 34.

The lock-up torque converter operates as follows:

When the lock-up solenoid 35 is not energized so that the plunger 35a opens the fixed orifice 33 to let it communicate with the drain port 34, the chamber 30d is discharged via the drain port 34, allowing the spool 30e to assume the spring set position as illustrated by the upper half thereof viewing in FIG. 1(b). In the spring set position, the spool 30e allows the port 30a to communicate with the port 30b. This admits the torque converter pressure to the disengagement chamber 26 from the port 30b, via passage 23, radial opening 29B and axial bore 29A, allowing the same pressure as that within the disengagement chamber 25 to prevail in the disengagement chamber 26. The lock-up clutch piston 24 therefore is moved from the end wall of the input shell 4 and disengaged from same. Under this condition, the power from the ouput shaft 6 of the engine is transmitted via the drive plate 5, input shell 4, torque converter 1, turbine hub 8, springs 28 and output hub 10 to the output shaft 9 of the torque converter 1. In this manner, the lock-up torque converter transmits power in a so-called converter state.

When the lock-up solenoid 35 is energized so that the plunger 35a closes the fixed orifice 33, the same pressure as the forward pressure in the passage 32 prevails in the chamber 30d. Owing to this pressure in the chamber 30d, the spool 30e is urged against the spring 30f and assumes the spring resisted position as illustrated by the lower half viewing in FIG. 1(b), allowing the port 30a to communicate with the drain port 30c. Under this condition, the pressure in the disengagement chamber 26 is discharged via the axial bore 29A, radial opening 29B, passage 23 and port 30a by the drain port 30c, allowing the pressure in the engagement chamber 25 to press the clutch piston 24 against the end wall of the input shell 4. As a result, the lock-up clutch 2 is engaged to establish a lock-up state. Under this condition, the power from the output shaft 6 of the engine is transmitted via the drive plate 5, input shell 4, clutch piston 24 and output hub 10 to the output shaft 9 of the torque converter. In this manner, the lock-up torque converter transmits power in the lock-up state.

The lock-up solenoid 35 is energized periodically with a pulsating control signal whose duty ratio is controllably variable. A control unit 110 which controls the duty ratio of the control signal is illustrated in a block diagram in FIG. 1(b). As the duty ratio is increased, the pressure in the bias chamber 30d increases and thus the spool 30e decreases the degree of communication of the port 30a with the port 30b and increases the degree of communication of the port 30a with the drain port 30c. This causes a reduction in the pressure in the disengagement chamber 26. Therefore, the clutch engagement force increases. As the duty ratio is decreased, the pressure in the bias chamber 30d decreases and thus the spool 30e increases the degree of communication of the port 30a with the port 30b and decreases the degree of communication of the port 30a with the drain port 30c. This causes an increase in the pressure in the disengagement chamber 26. Therefore, the clutch engagement force decreases. In this manner, the clutch engagement force can be varied by varying the duty ratio.

Hereinafter, a torque sensor provided in the lock-up torque converter is described.

Figure 2:
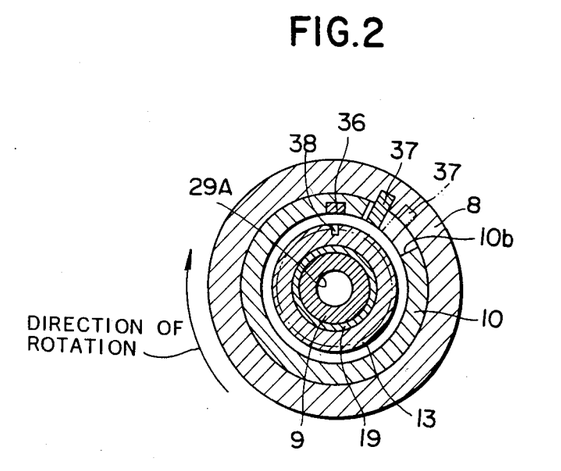
FIG. 2 is a section through the line II—II of FIG. 1(a)

Referring to the lock-up torque converter shown in FIG. 1(a), the output hub 10 splined to the output shaft 9 is drivingly connected to the turbine runner 7 via the plurality of springs 28 and the turbine hub 8 is secured to the turbine runner 7. This construction allows a measurement of a torque transmitted by a hydrodynamic drive to the output shaft 9. Referring to FIGS. 1(a) and 2, the output hub 10 has one axial end portion which is disposed concentrically and outwardly of the stationary sleeve 13, and the turbine hub 8 secured to the turbine 7 is arranged concentrically and outwardly of the output hub 10. As best seen in FIG. 2, the lock-up torque converter is provided with sensor elements 36, 37 and 38 which cooperate with each other to measure a torque transmitted to the output shaft 9. The sensor elements 36 and 37 are permanent magnets 36 and 37 which are mounted to the output hub 10 and the turbine hub 8, respectively. The permanent magnets 36 and 37 are disposed in the same radial plane and the permanent magnet 37 is displaced in the rotational direction ahead of the other permanenet magnet 36 and does not overlap with the latter. The leading permanent magnet 37 mounted to the turbine hub 8 extends through a circumferentially elongate slot 10b formed through the output hub 10 to face the outer surface of the stationary sleeve 13 like the trailing permanent magnet 36 does. The sensor element 38 is a reed switch. The reed switch 38 is embedded in the outer surface of the stationary sleeve 13. The reed switch 38 is disposed in the same radial plane where the permanent magnets 36 and 37 are disposed. The reed switch 38 is adapted to be closed each time it is approached by one of the permanent magnets 37 and 36 during rotation of the turbine hub 8.

Although, in the above described example, two permanent magnets 36 and 37 and one reed switch 38 are used, the permanent magnets may be replaced with light reflecting mirrors and the reed switch 38 by a light emitting diode or a photo transistor. It is also possible to use as sensor elements a reluctance element or a Hall element.

Figures 3A, 3B:
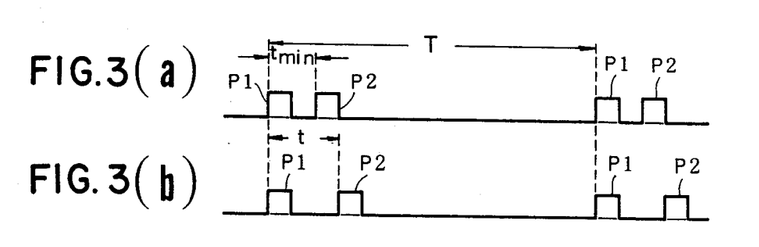
FIG. 3(a) is a timing diagram of pulses P1 and P2 when no torque is transmitted by the hydrodynamic drive.
FIG. 3(b) is a timing diagram of pulses P1 and P2 when torque is transmitted by the hydrodynamic drive.

When there is no torque transmission, the turbine hub 8 and the output hub 10 assume the relative positions as illustrated by fully drawn line in FIG. 2. Since, the hubs 8 and 10 are rotated in a direction indicated by an arrow in FIG. 2, the reed switch 38 is closed first by the leading permanent magnet 37 to produce an output pulse P1, and subsequently closed by the trailing permanent magnet 36 to produce another output pulse P2 during one revolution period T (see FIG. 3(a)), and a pulse interval between these both output pulses is a minimum $t_{min}$. During operation in the converter state, the torque transmitted by the torque converter to the output shaft 9 increases, the increase in the torque causes the turbine hub 8 to displace in the forward rotational direction relative to the output hub 10 compressing the springs 28 until the reaction force by the springs 28 balances with the torque transmitted, thus allowing the leading permanent magnet 37 to displace relative to the trailing permanent magnet 36 to a position illustrated by the phantom line. As a result, the angular distance between the permanent magnets 36 and 37 increases and thus the pulse interval t between the pulses P1 and P2 that are generated by closing the reed switch 38 by the permanent magnets 36 and 37 also increases (see FIG. 3).

During operation in the lock-up state, no torque is transmitted through the torque converter 1, so that the pulse interval is $t_{min}$.

Hereinafter, the control unit 110 for the lock-up solenoid 35 is described. The control unit 110 includes a microcomputer shown diagrammatically in FIG. 4.

Figure 4:
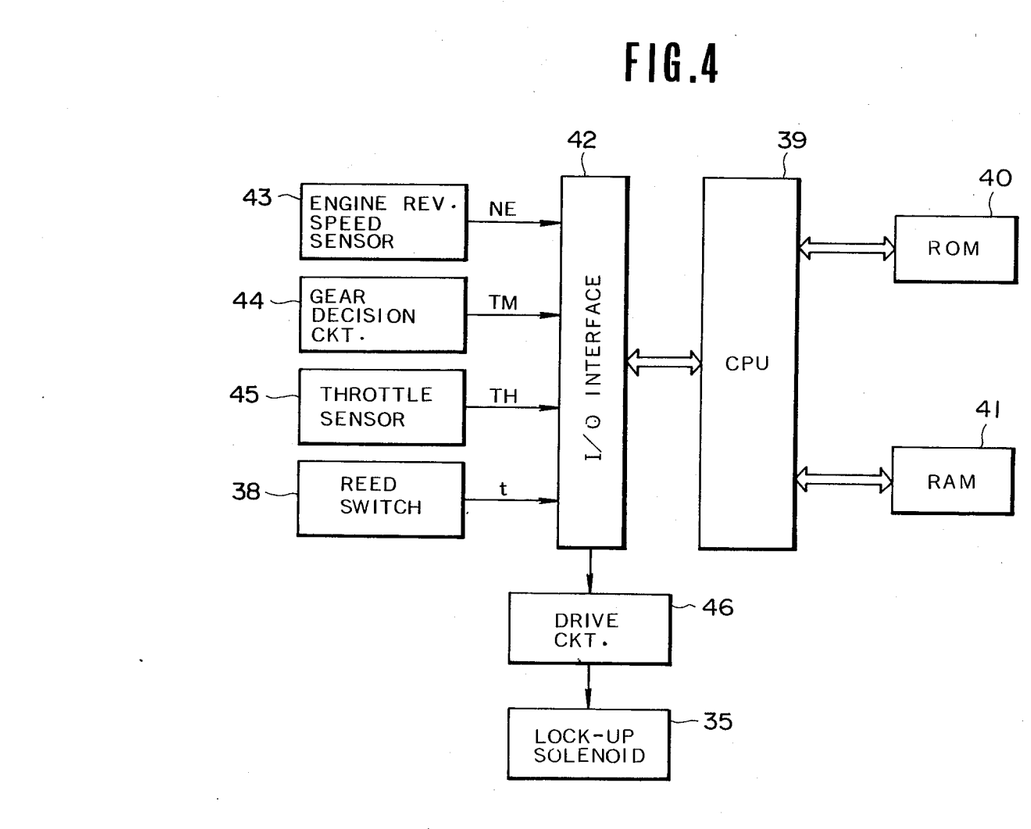
FIG. 4 is a block diagram of a control unit.
Figure 5A:
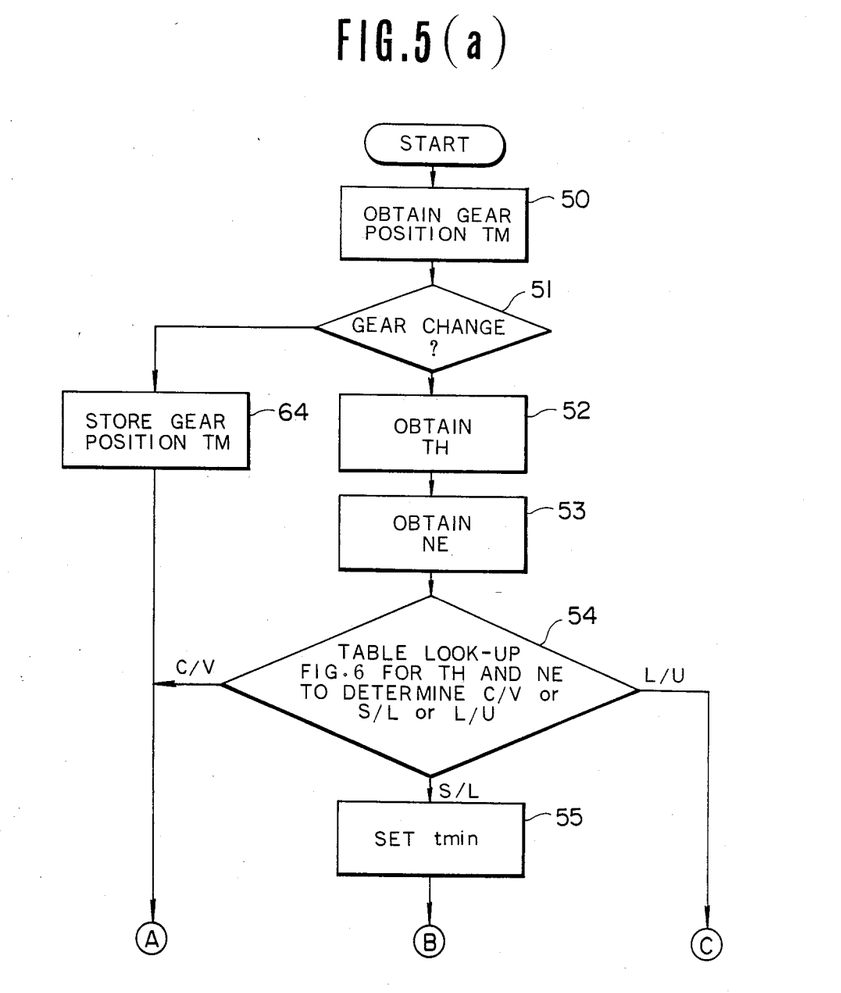
FIGS. 5(a) and 5(b) illustrate when combined a flow chart of a control program stored in ROM 40 shown in FIG. 4.
Figure 5B:
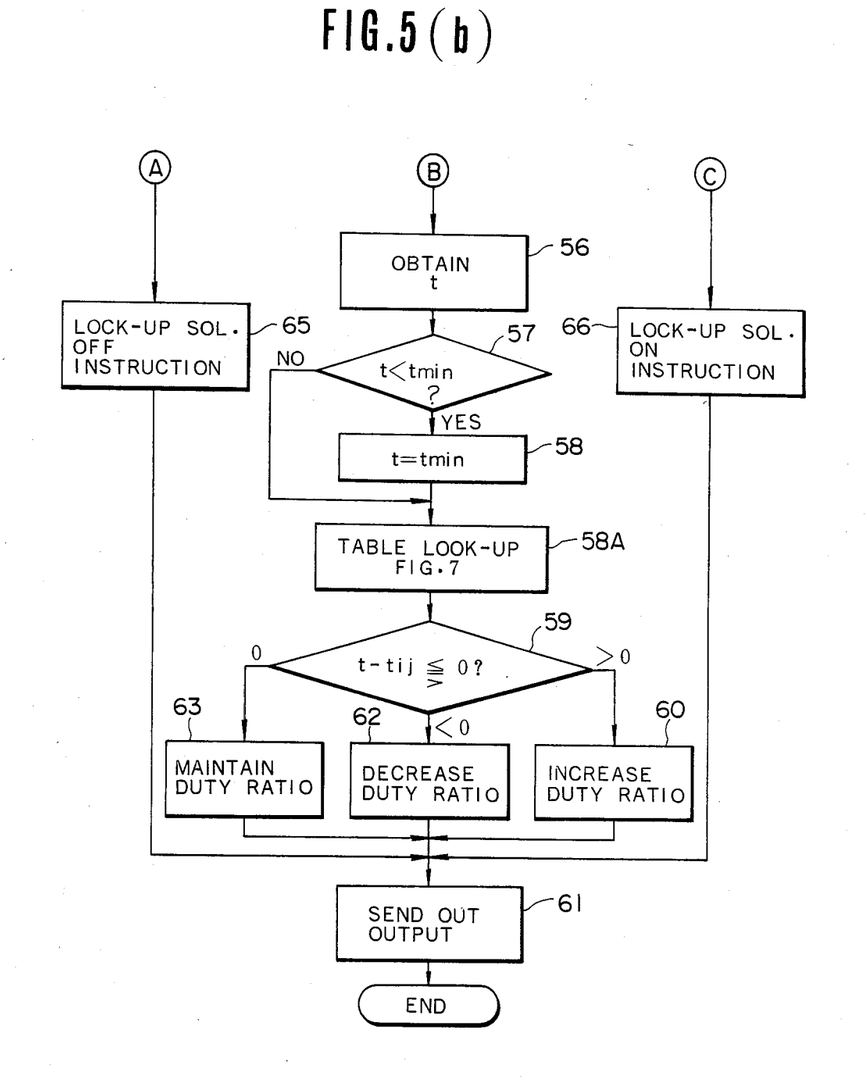

Referring to FIG. 4, the microcomputer comprises a CPU 39, a ROM 40, a RAM 41, and an I/O interface 42. Fed through the I/O interface 42 to the CPU 39 are the pulse interval t from the reed switch 38, an engine revolution speed signal NE from an engine revolution speed sensor 43, a gear position signal TM from a gear decision circuit 44, and a throttle opening signal TH from a throttle sensor 45. The gear decision circuit 44 is similar to a gear decision circuit 209 described in U.S. Patent Appln. Ser. No. 298,609, filed by Suzuki et al. on Sept. 2, 1981. The CPU 39 performs arithmetic operation on the above mentioned input signals along with a control program as shown in FIGS. 5(a) and 5(b) and sends out the result of the arithmetic operations to a drive circuit 46 past the I/O interface 42. The drive circuit 46 controls the lock-up solenoid 35.

Figure 6:
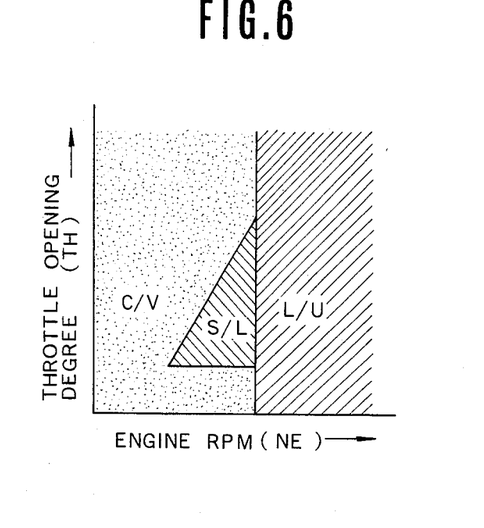
FIG. 6 illustrates a table containing three operation modes the lock-up torque converter should assume.

Referring to the control program shown in FIGS. 5(a) and 5(b), the gear position signal TM is obtained from the gear decision circuit 44 in step 50. A determination is made in step 51 whether a gear change is required or not. This is done by comparing the current gear position obtained in the present routine with the preceding gear position obtained in the preceding routine. If the gear change is not required, the process goes to steps 52 and 53. Throttle opening TH is obtained from throttle sensor 45 in step 52 and engine revolution speed signal NE from the engine revolution speed sensor 43 in step 53. In step 54, a determination is made which of the following three states the current operation of the engine falls in based on a table shown in FIG. 6 stored in the ROM 40. The three states include a converter state where the lock-up clutch 2 is released to accomplish a converter state (this state being hereinafter referred to as "C/V range"), a lock-up state wherein the lock-up clutch 2 is engaged to accomplish a lock-up state (this state being referred to as "L/U range"), and a sliding lock-up state wherein the the lock-up clutch is allowed to slip (this state being referred to as "S/L range").

If the determination in step 54 shows that the operation of the engine falls in the S/L range, the process goes to step 55 where $t_{min}$ is set. In step 56, the pulse interval t is obtained from the reed switch 38. In the next step 57, a comparison is made whether the pulse interval t is less than the value $t_{min}$. If the pulse interval t is less than $t_{min}$, the process goes to step 58 where the pulse interval t is given the value $t_{min}$. If t is not less than $t_{min}$, the process proceeds with the pulse interval being t which is obtained in step 56.

Figure 7:
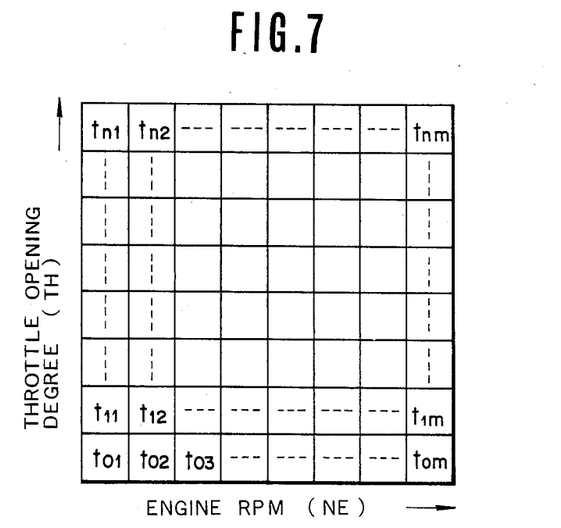
FIG. 7 is a table containing a desired torque transmitted by the hydrodynamic drive in terms of a desired pulse interval.

In step 58A, a desired pulse interval $t_{ij}$ is obtained by table look-up of FIG. 7 and the process goes to step 59 wherein the desired pulse interval $t_{ij}$ is subtracted from the pulse interval t. The table shown in FIG. 7 contains the values of pulse intervals versus engine revolution speed NE and throttle opening degree TH. The desired values of the pulse intervals correspond to predetermined desired torque to be transmitted to the output shaft 9 for various operating conditions of the engine. The operating condition of the engine is expressed in terms of the engine revolution speed and the degree of throttle opening. A desired pulse interval $t_{ij}$ is obtained by table look-up of the table shown in FIG. 7 using the signals TH and NE obtained in steps 52 and 53, respectively, before performing the arithmetic operation in step 59. If the result of the arithmetic operation $t-t_{ij}$ is positive, i.e., t is greater than $t_{ij}$, wherein the transmission torque from the turbine runner 7 to the output shaft 9 is greater than the desired torque, the process goes to step 60. In step 60, the duty ratio is increased. As a result, in step 61 the pulse signal having its duty ratio increased is sent out so as to cause the lock-up solenoid 35 to increase its time where it is energized, increasing the pressure in the chamber 30d of the lock-up control valve 30. The lock-up control valve 30 decreases the pressure in the disengagement chamber 26, allowing the clutch engagement force of the lock-up clutch 2 to increase. In this manner, the transmission torque from the turbine runner 7 to the output shaft 9 is decreased toward the desired torque.

If the result of the arithmetic operation $t-t_{ij}$ is negative, i.e., t is less than $t_{ij}$, where the transmission torque from the turbine runner 7 to the output shaft 9 is less than the desired torque, the process goes to step 62 wherein the duty ratio is decreased. The pulse signal sent out to the lock-up solenoid 35 by step 61 decreases the time where the solenoid 35 is energized, increasing the pressure in the chamber 26. This causes the clutch engagement force of the lock-up clutch 2 to decrease, allowing the transmission torque to increase toward the desired torque.

If the result of the arithmetic operation $t-t_{ij}$ is zero, i.e., $t=t_{ij}$, where the transmission torque from the turbine runner 7 to the output shaft 9 is equal to the desired torque, the process goes to step 63 wherein the duty ratio is maintained. Thus, the duty ratio of the pulse signal sent out to the lock-up solenoid 35 in step 61 is maintained, holding the clutch engagement force of the lock-up clutch 2. As a result, the transmission torque from the turbine runner 7 to the output shaft 9 is maintained at the desired torque. Although, in the above description, the duty ratio is varied until the pulse interval t becomes equal to $t_{ij}$, a suitable allowance around the desired pulse interval $t_{ij}$ may be set so that the duty ratio is maintained when deviation of the pulse interval t from the desired pulse interval $t_{ij}$ is within a predetermined value.

Since the actual transmission torque to the output shaft 9 is adjusted to the desired value for any operating condition of the engine, the lock-up torque converter will not vibrate over all of the operating conditions of the engine even if there occurs a change in engine output torque. Further, according to the present invention, the transmission torque which is to be controlled is directly measured and the clutch slip is controlled to maintain the transmission torque to the desired value for the operating condition of the engine, more accurate clutch slip control is carried out with a uniform result unaffected by the manufacturing tolerance of the torque converters. Thus, the clutch slip control according to the present invention is free from the drawbacks encountered in the known art wherein a control is carried out in response to a difference between the rotation of the engine and that of the output shaft of the torque converter so as to keep this difference to a preset value, and another drawback encountered in the known art wherein the control is carried out in response to the torque transmitted by the turbine of the torque converter so that the control takes place after the occurrence of vibration of the torque converter.

If the determination is made in step 51 that a gear change is required, the process goes to step 64 wherein the gear position stored in the RAM 41 is cleared and a new gear position is stored in the RAM 41 for use in the further process. Thereafter, the process goes to step 65 wherein the lock-up solenoid off instruction signal is obtained, and this signal is sent out in the step 61 to the lock-up solenoid 35. Then, the lock-up solenoid is deenergized, releasing the engagement of the lock-up clutch 2 during shifting operation in the automatic transmission, thus preventing the occurrence of a shift shock which would take place upon shifting with the clutch 2 left engaged. The release of the engagement of the clutch 2 is carried out also when it is determined in step 54 that the engine is operating in the C/V range.

If it is determined in step 54 that the engine is operating in the L/U range, the process goes to step 66 wherein a lock-up solenoid on instruction signal is obtained, and this signal is sent out in step 61 to the lock-up solenoid 35. The lock-up solenoid 35 is then energized, thus completely engaging the clutch 2 in the L/U range.

The execution of one routine is effected once after one rotation of the output shaft 9 of the torque converter or after a predetermined period of time. However, such precise control is not necessary during coasting operation of the vehicle wherein engine torque variation does not exist or during operation wherein the degree of throttle opening is maintained or the engine revolution is very low. Under such operating conditions, it is preferrable to switch the program on which the microcomputer runs run from the program shown in FIGS. 5(a) and 5(b) to a program shown in FIGS. 8(a) and 8(b) or that shown in FIGS. 9(a) and 9(b).

Figure 8A:
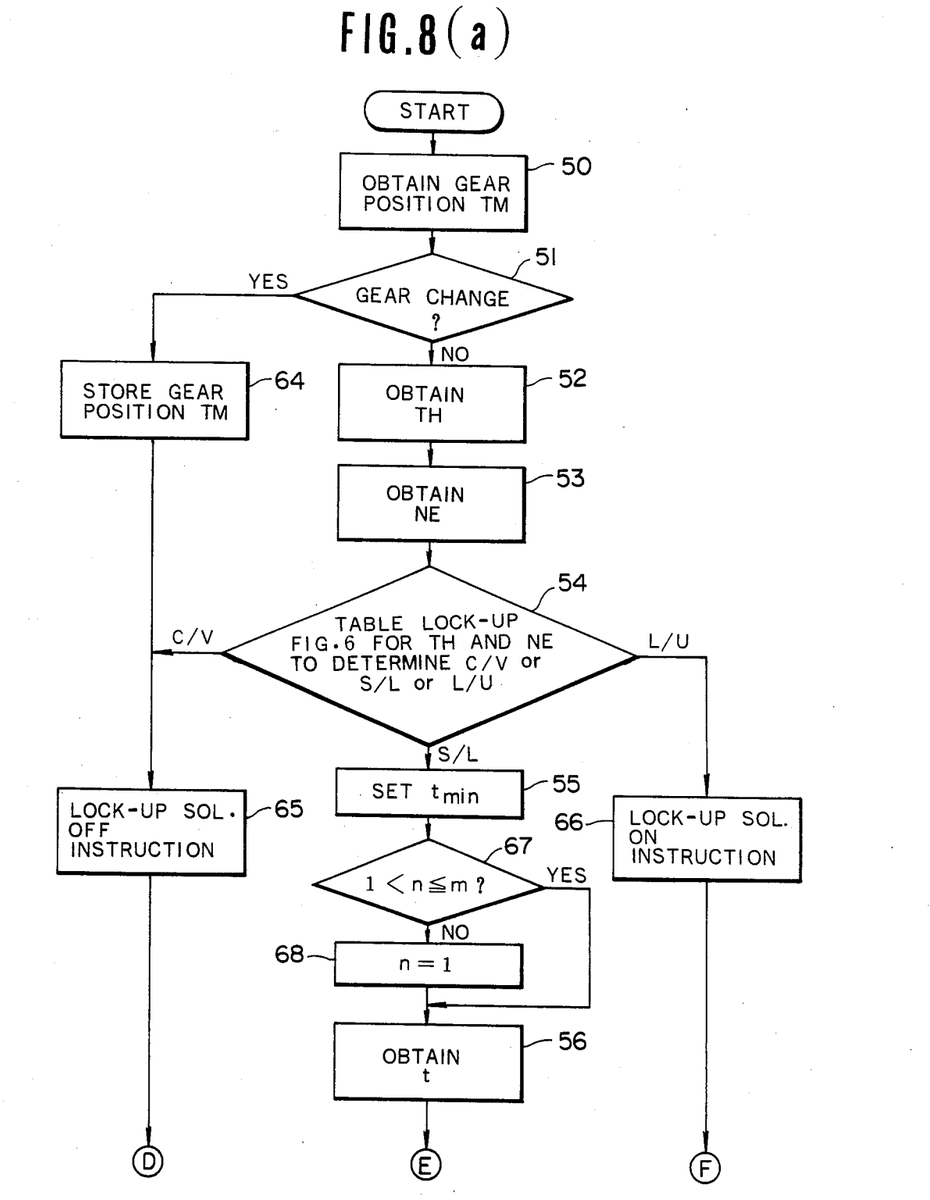
FIGS. 8(a) and 8(b) illustrate when combined a flow chart of another control program which if desired may be stored in the ROM 40 shown in FIG. 4.
Figure 8B:
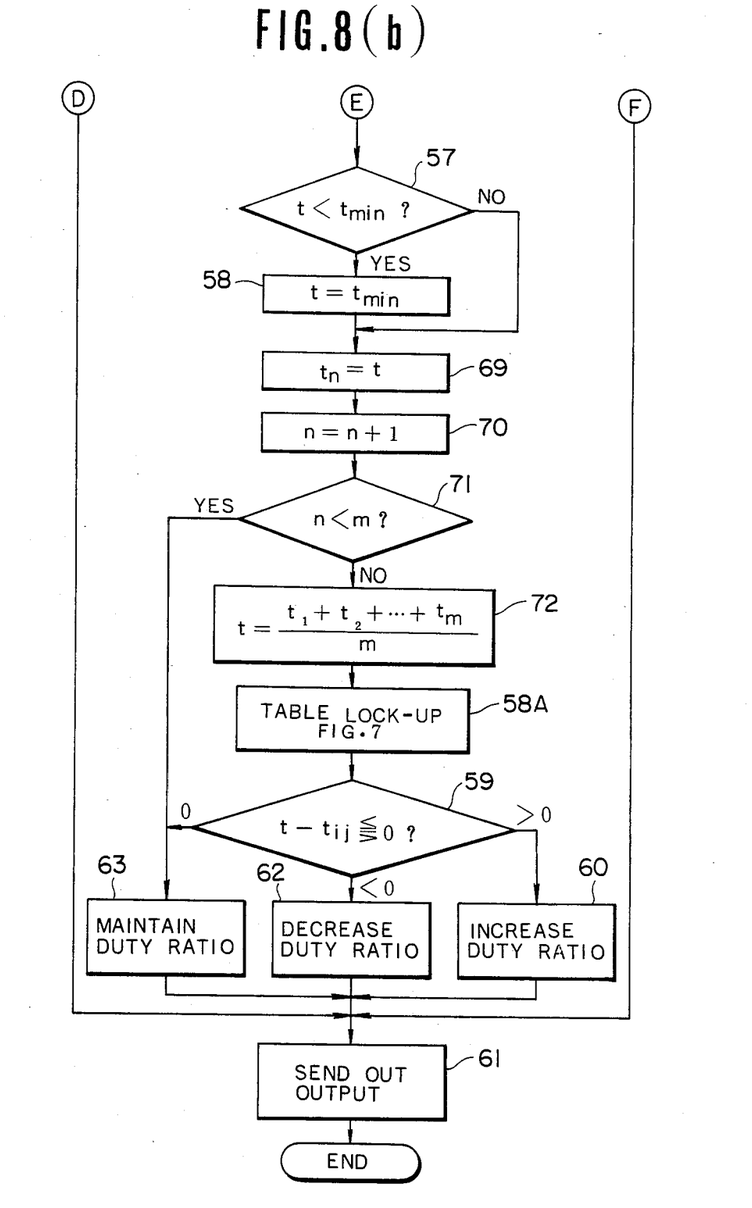

Referring to FIGS. 8(a) and 8(b), this program features that a mean value of the pulse intervals obtained m times is calculated and used as the pulse interval t for arithmetric operation $t - t_{ij}$ in step 59. The flow chart shown in FIGS. 8(a) and 8(b) is different from that shown in FIGS. 5(a) and 5(b) in that steps 67 and 68 are inserted between steps 55 and 56, and steps 69, 70, 71, 72 are inserted between steps 58 and 58A. In step 67, a determination is made whether the number n, i.e., the number of times the pulse interval is obtained in step 68, is greater than one (1) and less than or equal to the number m. In the step 67, a determination is made whether the number n has reached the predetermined number m or not. If the number n is smaller than or equal to one (1), the number n is set equal to one (1) in step 68. If the number n is larger than one (1) but smaller than the predetermined number m, the process bypasses the step 56 and goes to step 56 from step 67. In step 69, the pulse interval obtained in step 56 which is the pulse interval obtained at n th time is stored as $t_n$ in the RAM 41. Since in the next step 70, n is increased by one (1), the pulse intervals obtained in the first to m th routines are stored as $t_1 - t_m$ in the RAM 41. In step 71, if the number n is smaller than the predetermined number m, the duty ratio is maintained in step 63. If it exceeds the predetermined number m, the process goes to step 72. In step 72, a mean value of the pulse intervals $t_1 - t_m$ is computed. The result of this computation is used as the pulse interval t in the following arithmetic operation $t - t_{ij}$ in step 59. Thus, the duty ratio is maintained as long as the number n is smaller than the predetermined number m, but is varied if necessary when the number n exceeds the predetermined number m.

Figure 9A:
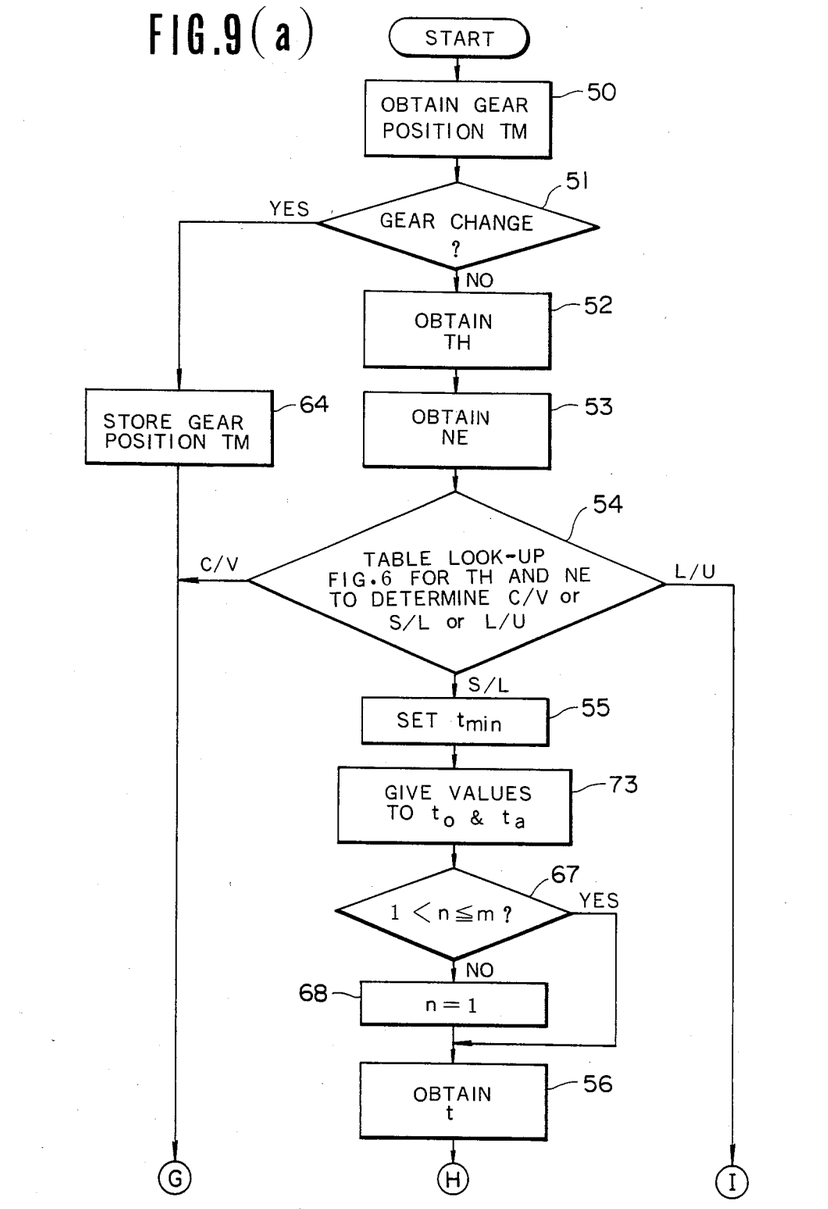
FIGS. 9(a) and 9(b) when combined illustrate a flow chart of an alternative control program to the program shown in FIGS. 8(a) and 8(b).
Figure 9B:
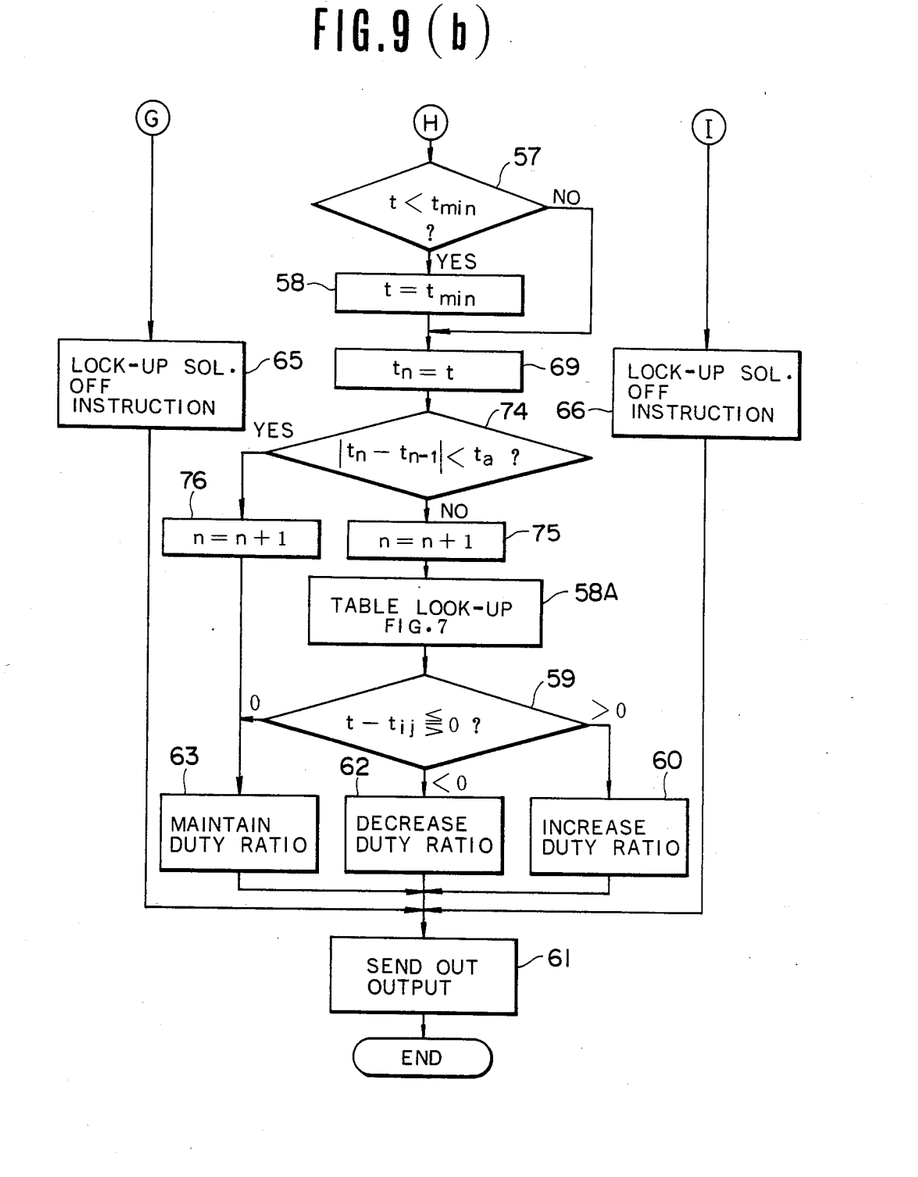

Referring to FIGS. 9(a) and 9(b), the duty ratio control is carried out only when the pulse interval obtained in step 56 differs from that obtained in the preceding routine by a predetermined value $t_a$, i.e., when the torque variation exceeds a predetermined value, because under this condition the vibration is likely to take place. The flow chart shown in FIGS. 9(a) and 9(b) is different from that in FIGS. 5(a) and 5(b) in that steps 73, 67, 68 are inserted between steps 55, 56, and steps 69, 74, 75, 76 between steps 58, 58A. In step 73, $t_0$ and $t_a$ are given values for comparison in step 74 with the pulse interval t obtained in step 56. In step 74, a determination is made whether the absolute difference between the pulse interval obtained in the present routine $t_n$ and the pulse interval obtained in the preceding routine $t_{n-1}$ is less than $t_a$ or not. In the initial routine an absolute difference between the $t_1$ and the initial value $t_0$ is calculated and compared with $t_a$ in step 74. If the determination in step 74 indicates that the difference is less than $t_a$ (yes), the process goes via step 76 to step 63, thus maintaining the duty ratio. If not, i.e., the torque variation is greater than $t_a$, the process goes via step 75 to step 59, thus performing the control of the clutch engagement based on the pulse interval $t_n$ obtained (see step 69). In steps 75 and 76, the number n is increased by one (1).

We claim:

1. A method for controlling the clutch slip in a lock-up torque converter including a torque converter having an input member driven by a prime mover, a pump impeller secured to the input member, a turbine runner cooperating with the pump impeller to form a toroidal fluid circuit, an output member, and a fluid operated friction clutch which is engageable to provide a mechanical drive between the input and output members to limit a hydrodynamic drive between the input and output members through the pump impeller and turbine runner, said method comprising the steps of:
   measuring an actual value of torque transmission through the hydrodynamic drive to the output member;
   detecting an operating state of the prime mover when said prime mover is operating;
   determining a desired value of torque transmission through the hydrodynamic drive to said output member in response to the operating state of the prime mover detected in said detecting step, said desired value being a different predetermined value for each different operating state of said prime mover; and
   controlling slip in the fluid operated friction clutch in such a manner as to adjust the actual value of torque transmission toward said desired value of torque transmission.

2. A method as claimed in claim 1, wherein the torque transmission through the hydrodynamic drive is measured by measuring an angular displacement of the turbine runner from the output member.

3. A lock-up torque converter associated with a prime mover, comprising:
   a torque converter including a stationary sleeve, an input shell driven by a prime mover, a pump impeller secured to said input shell and cooperating therewith to form an enclosed fluid space, a turbine runner disposed in said enclosed fluid space between said input shell and said pump impeller and cooperating with said pump impeller to form a toroidal fluid circuit, and an output hub connected to said turbine runner;
   a fluid operated friction clutch disposed between said turbine runner and said input shell to define an engagement chamber between said fluid operated clutch and said turbine runner, a disengagement chamber between said fluid operated clutch and said input shell, and a plurality of spring means for providing a drive torque transmitting connection between said turbine runner and said output hub;
   a torque sensor means for measuring an actual value of torque transmission from said turbine runner to said output hub and generating a sensor output signal indicative of said actual value of torque transmission;
   means for detecting an operating state of said prime mover when said prime mover is operating;

means for determining a desired value of torque transmission from said turbine runner to said output hub in response to the detected operating state of the prime mover and generating a desired signal indicative of said desired value of torque transmission; and control means for controlling an engaging fluid pressure provided to said fluid operated clutch so as to control slip in said fluid operated clutch in such a manner as to adjust said actual value of torque transmission toward said desired value of torque transmission.

4. A lock-up torque converter as claimed in claim 3, wherein said fluid operated friction clutch is connected to said outut hub and is engageable with said input shell to provide a drive torque transmitting connection between said input shell and said output hub.

5. A lock-up torque converter as claimed in claim 4, wherein said turbine runner has secured thereto a turbine hub arranged coaxially with said output hub and said stationary sleeve.

6. A lock-up torque converter as claimed in claim 5, wherein said output hub includes a radially extending section and said turbine hub includes a radially extending section, said plurality of spring means act between said radially extending sections of said output and turbine hubs, and said fluid operated friction clutch provides the drive torque transmitting connection between said input shell and said radially extending section of said output hub when it engages with said input shell.

7. A lock-up torque converter as claimed in claim 5, wherein said control means includes a lock-up control valve means, including a bias fluid chamber, communicating with said disengagement chamber for controlling fluid supply to said disengagenment chamber and fluid discharge from said disengagement chamber in response to fluid pressure in said bias fluid chamber to determine fluid pressure in said disengagement chamber, and a solenoid means for controlling fluid supply to and fluid discharge from said bias fluid chamber of said lock-up control valve means, and a microcomputer based control unit means for controlling a duty ratio of pulse electric signals supplied to said solenoid means to control fluid pressure in said bias chamber of said control valve.

8. A lock-up torque converter as claimed in claim 7, wherein said microcomputer based control unit means compares said sensor output signal with said desired signal.

9. A lock-up torque converter as claimed in claim 8, wherein said torque sensor means includes a first sensor element secured to said output hub, a second sensor element secured to said turbine hub, and a third sensor element secured to said stationary sleeve, said third sensor element being excited when it is approached by said first and second sensor elements.

10. A lock-up torque converter as claimed in claim 9, wherein said first and second elements are in the form of permanent magnets and said third sensing element is in the form of a reed switch.

11. A torque sensor for a torque transmitting mechanism including a stationary member, a driving member and a driven member coaxially arranged with the stationary and driving members, and spring means for providing a drive torque transmitting connection between the driving member and the driven member, comprising:

a first sensor element secured to the driving member;

a second sensor element secured to the driven member; and a third sensor element secured to the stationary element, said first, second and third sensor elements being disposed in the substantially same radial plane, said third sensor element being excited when said first and second sensor elements approach said third sensor element.

12. A torque sensor as claimed in claim 11, wherein said first and second sensor elements are in the form of permanent magnets and said third sensor element is in the form of a reed switch.

13. In a lock-up torque converter including:

a torque converter including a stationary sleeve, an input shell driven by a prime mover, a pump impeller secured to said input shell and cooperating therewith to form an enclosed fluid space, a turbine runner disposed in said enclosed fluid space between said input shell and said pump impeller and cooperating with said pump impeller to form a toroidal circuit, an output hub, and a turbine hub secured to said turbine runner;

a fluid operated friction clutch disposed between said turbine runner and said input shell to define an engagement chamber between said fluid operated friction clutch and said turbine runner, and a disengagement chamber between said fluid operated friction clutch and said input shell, and a plurality of spring means for providing a drive torque transmitting connection between said turbine hub and said output hub, said turbine hub being arranged coaxially with said output hub and said stationary sleeve; and a torque sensor comprising:

a first magnet secured to said turbine hub;

a second magnet secured to said output hub; and a reed switch secured to said stationary sleeve, said reed switch being excited when said first and second magnets approach said reed switch.

14. A method for controlling the clutch slip in a lock-up torque converter including a torque converter having an input member driven by an engine with a throttle, a pump impeller secured to the input member, a turbine runner cooperating with the pump impeller to form a toroidal fluid circuit, an output member, and a fluid operated friction clutch which is engageable to provide a mechanical drive between the input and output members, said method comprising the steps of:

measuring an actual value of torque transmission through the hydrodynamic drive to the output member;

detecting revolution speed of the engine;

detecting position of the throttle of the engine;

preparing data corresponding to desired values of torque transmission through the hydrodynamic drive to said output member, said desired values being a function of revolution speed of the engine and position of the throttle of the engine;

retrieving said data using revolution speed of the engine and position of the throttle of the engine which have been detected in said revolution speed and throttle position detecting steps, determining a desired value, and generating a desired signal indicative of said desired value determined; and controlling slip in the fluid operated friction clutch in such a manner as to adjust said actual value of torque transmission toward said desired value indicated by said desired signal.

* * * * *